June 2, 1970 R. S. JOYCE 3,515,107
TWO-BED EVAPORATIVE LOSS CONTROL DEVICE
Filed May 31, 1968
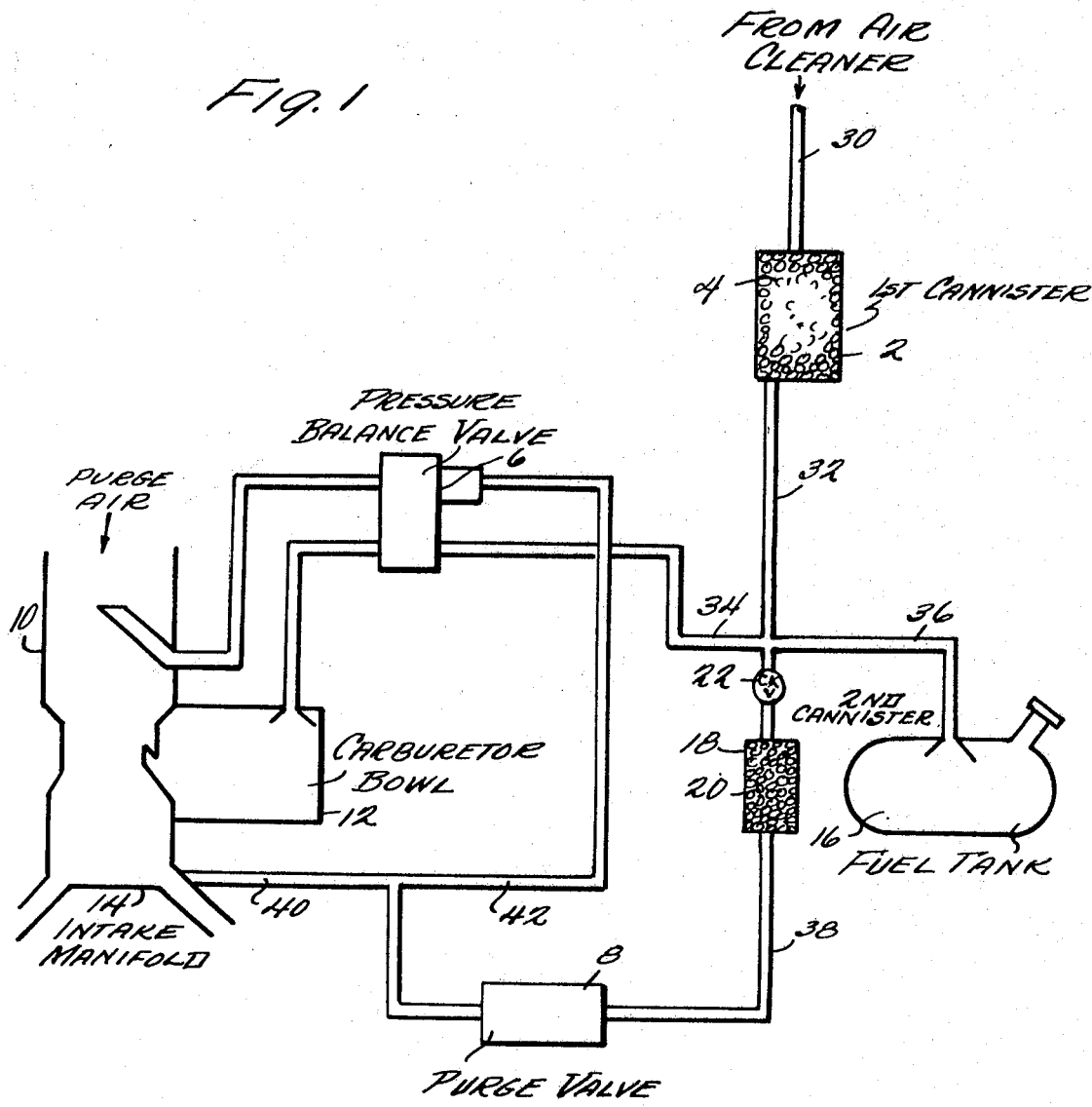
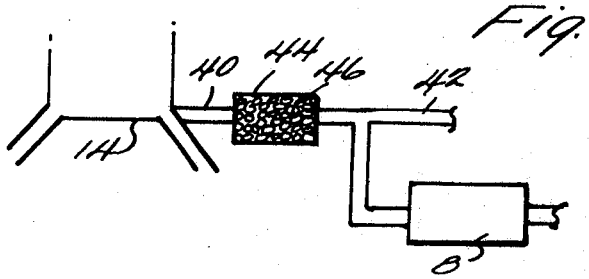
INVENTOR
RONALD S. JOYCE
BY Cushman, Darby & Cushman
ATTORNEYS United States Patent Office 3,515,107
Patented June 2, 1970

3,515,107
TWO-BED EVAPORATIVE LOSS CONTROL DEVICE
Ronald S. Joyce, Pittsburgh, Pa., assignor to Calgon Corporation, Calgon Center, Pittsburgh, Pa., a corporation of Pennsylvania
Filed May 31, 1968, Ser. No. 733,547
Int. Cl. F02m 67/08
U.S. Cl. 123—136                                      5 Claims

ABSTRACT OF THE DISCLOSURE

Minimizing of the initial surge of hydrocarbons in the purge cycle of a fuel vapor recovery system is accomplished by installing a second small carbon bed as shown in FIGS. 1 and 2. The second bed is not exposed to hydrocarbon vapors during the hot soak period.

---

The present invention relates to a fuel vapor recovery system.

The problem of evaporative emissions for automobile fuel systems is one of growing significance to the petroleum and automobile industries. As pointed out in Wentworth 3,093,124 the smog and pollution problem has directed attention to eliminating gasoline vapors which may escape from the fuel tank and carburetor float bowl. In addition the Motor Vehicle Pollution Control Board of California has proposed standards for the control of the evaporation losses, considering them to represent a sizable contribution to the smog problems. Further interest in controlling evaporative losses has been shown by the United States Government with the publication of proposed standards for such losses in the Federal Register.

As part of the means for eliminating the gasoline vapors Wentworth discloses the use of a canister filled with an adsorbent, e.g. activated carbon, for the volatile portions of the gasoline. Gasoline vapors given off by the engine fuel reservoir and the engine carburetor while the engine is not operating are recovered and retained in the canister and are subsequently released during engine operation, conducted to the engine and burned therein. This release is accomplished by using the full flow of the engine air or a partial flow of the engine air through the adsorbent.

As explained in a paper entitled "An Adsorption Regeneration Approach to the Problem of Evaporative Control," presented at the Society of Automative Engineers, Detroit, Mich., Jan. 13, 1967, the basic evaporative loss control system has three essential components, (1) the canister containing the adsorbent for gasoline vapors, (2) the pressure balance valve, and (3) the purge control valve. The canister traps hydrocarbon vapors before they can escape to the atmosphere and holds them there until such time as they can be sent to the engine. The purpose of the pressure balance valve is to maintain metering forces in the carburetor exactly as they were originally designed while at the same time closing all external vents and routing hydrocarbon vapors from the carburetor bowl to the canister. The vapors from the fuel tank are also permitted to go to the canister. The function of the purge control valve is to allow the stripping of the hydrocarbon from the canister and the consequent feeding of the hydrocarbon laden purge air stream to the intake manifold. This is permitted to take place only under certain modes of engine operation.

Such a fuel vapor recovery system greatly reduces the emission of unburned hydrocarbons to the atmosphere. Thus the Motor Vehicle Pollution Control Board of California has propsed the following standards for the control of hydrocarbon evaporation losses, from the carburetor 2 grams per hot soak and 6 grams per day from the fuel tank as against normal operating conditions wherein 10 grams of hydrocarbons are lost per hot soak from the carburetor and 30 grams of hydrocarbons are lost per day from the fuel tank. By use of the fuel vapor recovery system described in the aforementioned paper the tank loss was reduced to 0 gram per day in three test cars and the carburetor loss per hot soak was reduced to a range of 0.9 to 1.4 grams.

In the system described in Wentworth Pat. 3,093,124 the vapors given off of the carburetor float bowl and gasoline tank while the engine is off are captured in an adsorbent canister encircling the exhaust pipe. Each time the car is driven the canister will be heated and the adsorbent material purge off the trapped fuel vapors. In Wentworth Pat. 3,221,724 a fuel vapor recovery system is provided in which a low reactivating temperature adsorbent is used.

When the engine is off, vent lines from the carburetor float bowl and the fuel tank delivers raw gas vapor mixtures to the adsorbent where they are accepted and stored. When the engine is started the air sucked through the air intake and carburetor passes through and around the adsorbent bed bringing it to its desorption temperature, thus driving off the trapped fuel vapors. These vapors are carried off to the combustion chamber of the engine and burned.

The air to fuel ratio within the engine is desirably in the range of 12–16 to 1. At present the problem is that no commercial method has been devised for desorbing the lost hydrocarbon material from the canister containing activated carbon or the like and feeding it back to the intake system for combustion without causing an over-rich air-fuel mixture during the initial portion of the purge cycle. This results in such a rich mixture that engine performance is irregular and poor (i.e. hesitation; stumble) and CO content is increased. This is because of the rapid rate of hydrocarbon release during the first ten minutes of desorption.

Accordingly it is an object of the present invention to devise an improved method for desorbing volatiles from the canister of an ELCD.

Another object is to desorb volatile hydrocarbons from an ELCD and feed them back to the engine for combustion without causing a lean or rich gas-air mixture which would cause pollutants, e.g. gaseous hydrocarbons, from coming out of the exhaust pipe.

Still further objects and the entire scope of applicability of the present invention will become apparent from the detailed description given hereinafter; it should be understood, however, that the detailed description and specific examples, while indicating preferred embodiments of the invention, are given by way of illustration only.

It has now been found that these objects can be attained by employing two adsorbents, e.g. activated carbon beds. The first or main bed is the conventional one and is installed below the air cleaner. The second, and generally smaller activated carbon bed is positioned in the system so that it is not exposed to hydrocarbon vapors in the hot soak period but the exit bed from the main vapors are passed through the second bed during the purge cycle. The second bed thus adsorbs a part of the initial surge of hydrocarbon vapors from the main bed in the purge cycle and is desorbed later after the first bed has been desorbed. The second bed is not purged until the air intake is sufficiently high that the volume of desorbed hydrocarbons will have only a minor effect on the air-fuel ratio.

As stated the air to fuel ratio fed to the carburetor in accordance with accepted practice is normally maintained in the range of about 12–16 to 1, preferably between 15:1 and 16:1. Thus, the vapors coming from the second activated carbon bed can be composed of 0.1 to 1.0 c.f.m. of fuel and 0.1 to 1.0 c.f.m of air containing hydrocarbon vapors and can be mixed with an additional 15 c.f.m. of air introduced directly into the carburetor throat. The adsorbent employed in the canister as set forth in the description of the drawings was Pittsburgh type BPX activated carbon (12 x 30 mesh U.S. Sieve Series) but there can also be used any other conventional activated carbon, as well as other adsorbents, e.g. molecular sieves. The preferred adsorbents are activated carbons.

The fuel employed in the system as described in connection with the drawings was gasoline but the system is operative with other hydrocarbon fuels, e.g. kerosene, diesel oil, etc.

The invention will be understood best in connection with the drawings wherein:

FIG. 1 is a somewhat schematic diagram illustrating one evaporative loss control device system according to the invention; and FIG. 2 is a partial view of an alternative system according to the invention.

Referring more specifically to FIG. 1 of the drawings there is shown a fuel vapor recovery system specifically an evaporative loss control device including a canister 2 containing activated carbon 4, a pressure balance valve 6, a purge control valve 8, carburetor 10, carburetor float bowl 12, engine intake manifold 14, gasoline tank 16, auxiliary canister 18 containing activated carbon 20 and flapper valve 22. There are also provided various conduits such as conduits 30, 32, 34, 36, 38, 40 and 42.

In the purging condition of the system the hydrocarbon vapors which have been adsorbed on the activated carbon bed 4 in the canister 2 are desorbed with the aid of air passing from conduit 30 through canister 2 to conduit 32 to open flapper valve 22 and then canister 18 containing activated carbon bed 20. Bed 20 adsorbs part of the initial surge of hydrocarbon and later desorbs it after the first carbon bed 4 has been desorbed. The vapors after leaving bed 20 go through conduit 38 to purge control valve 8 and then to the engine intake manifold 14. Air at a controlled rate also goes directly from the air cleaner to the carburetor 10. Thus 15 c.f.m. of air can go directly to the carburetor and 1 c.f.m. of air pass through canisters 2 and 18, pick up desorbed vapors from canister 2, partially deposit them in canister 18 and carry the rest of them to the intake manifold to give an overall air to fuel ratio of about 16:1. The flapper valve 22 is open only when purge air is drawn through the beds, i.e. in the purge cycle only.

In the hot soak condition, gasoline vapors go from the fuel tank 16 to the canister 2 by conduits 36 and 32 but are prevented from going to canister 18 and the engine manifold by flapper valve 22 which is in the closed condition. Gasoline vapors go from the carburetor bowl 12 through the pressure balance valve 6 and conduit 34 to canister 2, valve 22 again preventing the vapors from going to canister 18.

In the form of invention illustrated in FIG. 2 the device is the same as in FIG. 1 except that valve 22 and canister 18 containing activated carbon bed 20 are deleted and there is inserted a canister 44 containing activated carbon bed 46 positioned between the purge valve 8 and intake manifold 14. The operation of the system in the purge cycle is essentially the same as that described in connection with FIG. 1. The initial surge of hydrocarbons coming from bed 4 in the purge cycle are adsorbed on bed 46 and then gradually desorbed or purged later in the purge cycle.

While only a single auxiliary carbon bed has been shown in the drawings obviously additional auxiliary beds can be employed, e.g. 2, 3, 4 or more such beds.

What is claimed is:

1. In a method of recovering fuel vapor from an engine fuel system wherein the fuel vapor is adsorbed on a first adsorbent bed in one portion of a cycle and the fuel vapor is desorbed with purging air in a purging portion of a cycle and the released fuel vapor is burned in the engine the improvement comprising providing a second adsorbent bed, permitting fuel vapors from the first bed to go to the second bed during the purging portion of the cycle and preventing fuel vapors from going to said second bed in the remaining portion of the cycle.

2. A method according to claim 1 wherein the adsorbent is activated carbon.

3. A method according to claim 1 wherein the first and second beds are in series.

4. A method according to claim 2 wherein during the purge portion of the cycle the fuel vapors from the first bed are initially adsorbed on the second bed during the purge portion of the cycle and are then desorbed therefrom.

5. A method according to claim 4 wherein the second adsorbent bed is smaller than the first bed.

References Cited

UNITED STATES PATENTS

| 3,221,724 | 12/1965 | Wentworth | 123—136 |
| 3,368,326 | 2/1968 | Hervert | 123—136 |

LAURENCE M. GOODRIDGE, Primary Examiner

U.S. Cl. X.R.

123—121

PO-1050
(5/69)

UNITED STATES PATENT OFFICE
CERTIFICATE OF CORRECTION

Patent No. 3,515,107                Dated   June 2, 1970

Inventor(s)   Ronald S. Joyce

It is certified that error appears in the above-identified patent and that said Letters Patent are hereby corrected as shown below:

In the specification, column 1, line 69, "propsed" should read -- proposed --.

In the specification, column 2, line 57, "bed" should read -- vapors --.

In the specification, column 2, line 57, "vapors" should read -- bed --.

In claim 1, column 4, line 19, after "system", insert -- having an air cleaner --.

In claim 1, column 4, line 20, after "bed", insert -- after said air cleaner --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents